(12) United States Patent
McNeill et al.

(10) Patent No.: US 7,924,747 B2
(45) Date of Patent: Apr. 12, 2011

(54) ENHANCEMENT OF NODE CONNECTIVITY IN A WIRELESS COMMUNICATIONS NETWORK WITH CHANGING TOPOLOGY VIA ADAPTIVE ROLE CHANGING

(75) Inventors: Kevin M. McNeill, Alexandria, VA (US); Matthew Sherman, Succasunna, NJ (US); David Claypool, Stephens City, VA (US); Keith Conner, Boonton, NJ (US); Tim McNevin, Reston, VA (US); Phong C. Khuu, Ashburn, VA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 347 days.

(21) Appl. No.: 11/998,356

(22) Filed: Nov. 29, 2007

(65) Prior Publication Data
US 2009/0141653 A1 Jun. 4, 2009

(51) Int. Cl.
*H04L 12/28* (2006.01)
(52) U.S. Cl. ........................ 370/254; 709/223
(58) Field of Classification Search .................. 370/254, 370/255, 256; 709/223–226
See application file for complete search history.

(56) References Cited

U.S. PATENT DOCUMENTS

| | | | |
|---|---|---|---|
| 6,662,229 B2 * | 12/2003 | Passman et al. | 709/227 |
| 7,031,274 B2 | 4/2006 | Sherman | |
| 7,133,381 B2 | 11/2006 | Sherman | |
| 7,184,421 B1 * | 2/2007 | Liu et al. | 370/338 |
| 7,821,994 B2 | 10/2010 | Sherman et al. | |
| 2002/0082035 A1 * | 6/2002 | Aihara et al. | 455/518 |
| 2003/0174067 A1 | 9/2003 | Soliman | |
| 2006/0182117 A1 | 8/2006 | Chen et al. | |
| 2007/0070918 A1 | 3/2007 | Hershey | |
| 2007/0140239 A1 * | 6/2007 | Bauer et al. | 370/389 |
| 2007/0258371 A1 * | 11/2007 | Chen et al. | 370/235 |
| 2009/0034432 A1 * | 2/2009 | Bonta et al. | 370/255 |
| 2009/0213815 A1 | 8/2009 | Sherman et al. | |

* cited by examiner

*Primary Examiner* — Dang T Ton
*Assistant Examiner* — Kevin Lee
(74) *Attorney, Agent, or Firm* — Leo Zucker

(57) ABSTRACT

A process and system for enhancing connectivity among nodes of a wireless communications network by adapting to changes in the network topology. Nodes of the network are configured to operate according to either (i) an ad hoc protocol wherein a given node assumes a role of a mesh node capable of connecting with other like-configured nodes, or (ii) a point-to-multipoint protocol wherein the given node assumes a role of either a base station, or a subscriber station being served by another node which is assuming the role of a base station. A determination is made as to whether each node should operate according to the ad hoc protocol or the point-to-multipoint protocol, in order to maintain an optimum state of connectivity among all nodes of the network. The determined operating protocol is then implemented for each node.

16 Claims, 10 Drawing Sheets

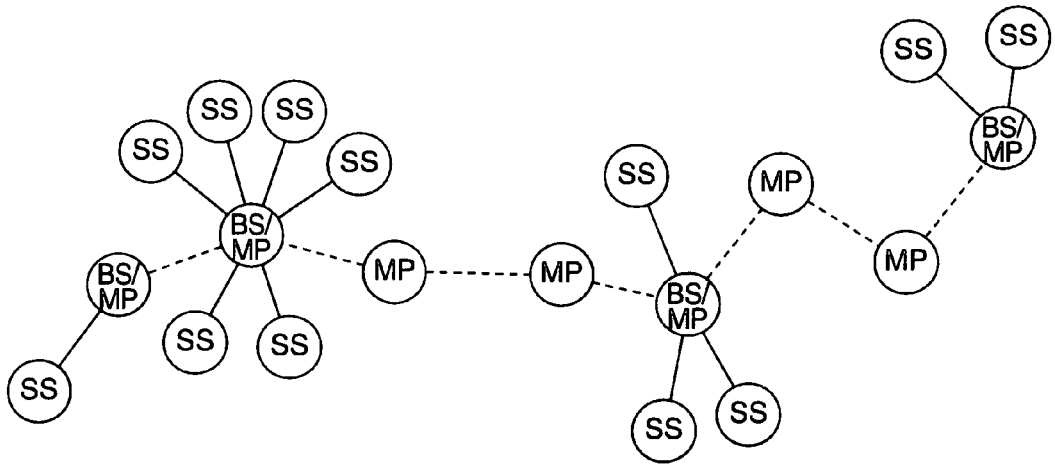

EXEMPLARY ALGORITHM - GLOBAL STATIC ROLE DETERMINATION

Node Node_set[], Assigned_set[], Current_Node, 'T':

For each (Topology Change Event) {
        Unassign_all (Node_set);
        Sort (Node_set, "by No. of unassigned neighbors");
        While (Current_Node = Pop(Node_set)){
                Set_Node(Current_Node, TYPE, "BS");
                Set_Neighbors(Current_Node, TYPE, "SS");
                Move_Assigned(Current_Node, Assigned_set);
                Sort(Node_set, "by No. of unassigned neighbors");
        }
        T = Make_Min_Spanning_Tree(Assigned_set, TYPE, "BS");
        Depth_first_tree_walk(T, "promote BS to MP/BS, promote SS to MP")
}

Disseminate (Assigned_set);

FIG. 5

```
Initialization {
    Initialize_Node_Attributes (this_Node);
    this_Node->NIR = Initialize_Neighbor_Lists (Nodes_in_Range);
    this_Node->CNL = Initialize_Neighbor_Lists (Nodes_Connected_to_this_Node);
    this_Node->CLD = Initialize_Cluster_Attributes(this_Cluster);
    this_Node->Set_Role(MP);
    this_Node->Set_GUID();
    exec("ARCA_Discovery_Listerner");
    exec("ARCA_Topology_Manager");
}

ARCA_Discovery_Listerner {            ─── 701
    forever{
        if(this_Node->Get_Role() == MP)Update_Role(this_Node);
        Create_Hello_Message(this_Node, Msg_buffer);
        Wait_Random(0.5°ARCA_Cycle, ARCA_Cycle);
        Send(Msg_buffer);
    }
}
                                       ─── 702
ARCA_Topology_Manager{
    Last_change_time = 0;
    forever{
        Old_TM = Current_TM;
        Zero_Topology_Map(Current_TM);

Start_Timer(Topology_Timer, ARCA_Cycle);
        while (Topology_Timer,Expired() == FALSE({
            Status = Receive_Wait(Disc_Msg_buffer, &len);
            if(status != TIME_OUT_EVENT)
                Update_Topology(Current_TM, Disc_Msg_buffer, len);
            else
                Last_change_time += 1;
        }
        if((Evaluate_Topology(Current_TM) == CHANGE_REQUIRED) ||
           (Last_change_time >= MAX_INTERVAL))
                ARCA_Change_Manager(Current_TM);
    }
}
```

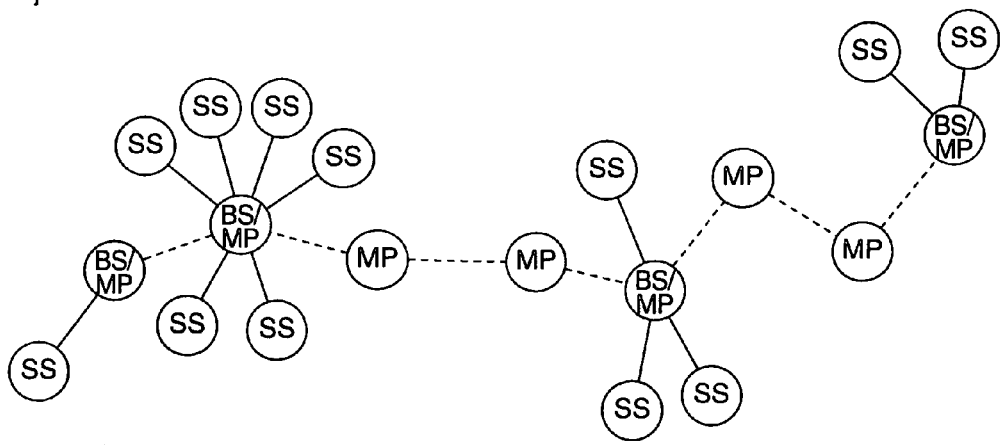

FIG. 7a

```
ARCA_Change_Manager {
    if(this_Node->Get_Role() == MP){
        if(this_Node->Neighbor_Change() == GAINED_NECESSARY_NEIGHBOR)
            Update_Topology(Current_TM);
703     else if(this_Node->Neighbor_Change() == LOST_NECESSARY_NEIGHBOR)
            this_Node->Connection_Needed(TRUE);
        flag = FALSE;
        foreach(bs = this_Node->get_next_BS_in_range()){
            if(bs->Has_critical_node() == TRUE)
                flag = TRUE;
        }
        if(flage == FALSE){
            this_Node->Set_Role(SS);
            return;
        } if((this_Node->NIR->Get_Number() == 0) && (this_Node->CNL->Get_Number() ==
            Set_Topology(Current_TM, this_Node, ISOLATED);
        else if(Check_Eligibility_Score(this_Node, this_Node->CNL) == TRUE){
            this_Node->Set_Role(BS);
            RETURN;
        }
    }else if(this_Node->Get_Role() == BS){
        Update_Subscriber_List(this_Node->CNL);
        if(this_Node->CNL->Get_SScount() == 0)
            this_Node->Set_Role(MP);
        }
        if(this_Node->CNI->BS_in_range() == TRUE)
            this_Node->Set_Role(SS);
    }else if(this_Node->Get_Role() == SS) {
        if(this_Node->CNL->BS_Lost() == TRUE){
            if(this_Node->CNL->BS_in_range() == TRUE){
                this_Node->Set_Role(SS);
            )else{
                this_Node->Set_Role(MP);
            }
        }else{
            flag = FALSE;
            foreach(bs = this_Node->get_next_BS_in_range()){
                if(bs->Range() <<this_Node->current_serving_bs())
                    flag = TRUE;
            }
            if(flag == TRUE){
                Current_TM->Initiate_BS_Change(this_Node, bs);
                return;
            }
        }
        if(Current_TM->isolated_Node_check(this_Node) == TRUE)
            this_Node->Set_Role(MP);

if(Current_TM->Adjacent_Cluster() == TRUE){
            this_Node->Set_Role(MP);
            Current_TM->Set_Initiate_Cluester_Link(TRUE, this_Node;
        }
    }
}
```

FIG. 7b

ENHANCEMENT OF NODE CONNECTIVITY IN A WIRELESS COMMUNICATIONS NETWORK WITH CHANGING TOPOLOGY VIA ADAPTIVE ROLE CHANGING

BACKGROUND THE INVENTION

1. Field of the Invention

This invention concerns wireless communication networks, particularly a process and system for preserving connectivity among nodes in a network as the topology of the network changes over time.

2. Discussion of the Known Art

So-called point to multipoint or PMP equipment is used often in broadband wireless network applications. Typically, the equipment is standards based or certified by an industry trade group, e.g., WiMAX Forum certified™, IEEE 802.16-2004™ (hereafter "802.16d"), IEEE 802.16e-2005™ (hereafter "802.16e"), or HIPERMAN. Mesh and mobile ad hoc network (MANET) systems are also used, especially in networks deployed for the military. An example of a mesh network resides in the mentioned 802.16d standard which defines a mesh mode of operation. The mesh mode defined in 802.16d is not capable of interoperating with the PMP mode defined in the standard, however. That is, users must elect to use only one of the two modes for operation in the network, and the standard does not suggest a process by which the operating mode of a network can change from PMP to mesh or vice versa over time during operation of the network Because allocations of radio frequency (RF) spectrum for wireless networks are generally difficult to obtain, it would be desirable for this and other reasons to be able to implement multiple operating protocols (e.g., PMP, mesh and MANET) at given times over a single network channel. For example, a node may be needed to perform the role of a relay station in order to extend the coverage of an existing PMP base station to subscriber stations that have moved out of the base station's range. In another example, two military convoys may have established their own PMP networks to maintain wireless connectivity among vehicles of the respective convoys while in motion. When mobile base stations of the two networks pass near one another, it would be desirable for the base stations to instantiate a MANET to be able to coordinate among themselves, while maintaining the roles of PMP base stations for serving the vehicular subscribers in the respective convoys.

As in the last example above, mobile military operations typically involve a significant change in network topology during the course of a mission. That is, at the start of the mission, elements of a military unit that operate as nodes of a network are usually gathered close to one another at their base. At this phase, a PMP network protocol offers an advantage of efficient use of network capacity. As the elements (i.e., nodes) of the network leave their bases and the mission unfolds, their motion generates continuous changes in the topology of the network and often adversely affects their connectivity among one another.

In another example, a military training exercise may require collection of performance data from thousands of RF devices in the field, and each soldier may be provided with a wireless device for relaying data he or she collects during the exercise. While the soldier devices would operate most efficiently in a PMP network environment, one or more of the devices may be outside the coverage of a PMP base station but must nonetheless forward the data wirelessly to the base station. In such a case, it would be desirable if the out-of-range devices could connect with an active subscriber station within range of the devices, and for the subscriber station to assume the role of a base station with respect to the devices so as to forward the data collected by the devices to the actual base station of the PMP network. Such a procedure may be implemented only if one or more of the subscriber stations of the PMP network are capable of changing their roles so as to adapt to changes in location of other nodes in the network.

That is, if nodes in a mobile unit's network are capable of changing their roles dynamically from that of, e.g., a PMP base or subscriber station to that of a mesh node, connectivity among all the nodes in the network may be maintained more effectively. While the network may possibly evolve during the course of a mission from fully PMP to fully mesh operation, it would likely need to support a mixture of the two modes at any given time during the mission. When the mission is completed and all the nodes return to their bases, the network may resume a fully PMP mode of operation.

U.S. Pat. No. 7,031,274 (Apr. 18, 2006) discloses a method of enabling systems following a known IEEE 802.11 protocol to interoperate with wireless local area networks (WLANs) that use an otherwise incompatible HIPERLAN/2 standard, on a common transmission channel. Further, U.S. Pat. No. 7,133,381 (Nov. 7, 2006) describes a method by which stations operating under an enhanced, IEEE 802.11e standard, can prevent interfering transmissions from stations that do not practice the enhanced standard.

International Application No. PCT/US/2007014386 filed Jun. 20, 2007, and assigned to the assignee of the present application and invention, discloses signal framing structures that may be used in a PMP configured network so as to implement MANET protocols in conjunction with PMP protocols. All relevant portions of the mentioned '386 PCT application are incorporated by reference.

SUMMARY OF THE INVENTION

According to the invention, a method of enhancing connectivity among nodes of a wireless communications network by adapting to changes of network topology, includes configuring a first set of one or more nodes to operate according to either of (i) an ad hoc protocol wherein a given node assumes a role of a mesh node capable of connecting with other like-configured nodes in communications range of the given node, or (ii) a point-to-multipoint protocol wherein the given node assumes a role of either a base station, or a subscriber station served by another node in communications range and which is assuming the role of a base station. The method also includes determining for each node of the first set whether the node should operate according to the ad hoc protocol or the point-to-multipoint protocol to maintain an optimum state of connectivity among all nodes of the network, and implementing the determined operating protocol for each node of the first set of nodes.

According to another aspect of the invention, a wireless communications network includes a first set of one or more nodes each constructed and arranged to operate according to either of (i) an ad hoc protocol wherein a given node assumes a role of a mesh node capable of connecting with other like-configured nodes in communications range of the given node, or (ii) a point-to-multipoint protocol wherein the given node assumes a role of either a base station, or a subscriber station served by another node in communications range and which is assuming the role of a base station. Further, one or more nodes are configured to determine, for each node of the first set, whether the node should operate according to the ad hoc protocol or the point-to-multipoint protocol to maintain an optimum state of connectivity among all nodes of the network by adapting to changes in topology of the network. Each node of the first set is configured to implement a determined operating protocol for the node.

For a better understanding of the invention, reference is made to the following description taken in conjunction with the accompanying drawing and the appended claims.

BRIEF DESCRIPTION OF THE DRAWING

In the drawing:

FIG. 5 is a diagram illustrating a centralized role changing process or algorithm for determining roles of certain nodes in a wireless communications network, according to the invention;

FIGS. 7a and 7b show an example of pseudo-code for a distributed algorithm for determining roles of nodes in a wireless communications network according to the invention;

DETAILED DESCRIPTION OF THE INVENTION

The present invention is directed to a process and system wherein certain nodes in a wireless communications network change roles they play in the network so as to maintain or enhance connectivity among the nodes, notwithstanding ongoing changes in network topology. In particular, a given node may assume multiple operating protocols (e.g., PMP and mesh/MANET) to adapt to such changes on an ongoing basis.

As used herein, a "role" is defined as a certain operating protocol set (standards based or otherwise) that is implemented by a node in a network. A node changes its role by changing the protocol set it is currently implementing. A "mesh point'" (MP) node is a node that practices either known MANET or mesh protocols associated with the network, and which may also be capable of changing roles.

Other node types are defined in relation to their use of existing PMP network protocols. These include a base station (BS) node, a fixed subscriber station (SS) node, and a mobile subscriber station (MS) node. As disclosed herein, the MANET or mesh protocols may coexist in a single node with the PMP protocols. In addition, a relay station (RS) node is defined with specific relationships to the functionality of a BS node and a MP node.

Nodes practicing a superset of PMP and MP network protocols are defined, including a mesh base station (MBS) node which is constructed and arranged to implement the BS node and the MP node protocol sets. Nodes implementing the SS and the MS protocol sets can therefore interact with a BS node or a MBS node, but need not use the MP protocol set if they only participate in PMP aspects of the network. As mentioned, it is at times convenient to co-locate within a single node a MP protocol set with either a SS or a MS protocol set, in order to achieve certain desirable architectural elements.

A "mesh mode subscriber station" (MMS) node is defined as a subscriber station node capable of operating under either a mesh or a PMP protocol set, and which is also capable of changing roles.

Further, specific architectural concepts useful for routing and topology control may also be supported. These include the concepts of a domain node, a domain lead node, and a bridge node as defined in co-pending U.S. patent application Ser. No. 11/546,783 entitled "Adaptive Message Routing for Mobile Ad Hoc Networks" which was filed Oct. 12, 2006, and is assigned to the assignee of the present application and invention. The '783 application issued as U.S. Pat. No. 7,656,851 on Feb. 2, 2010. All relevant portions of the '783 application are incorporated by reference.

Figure 1:
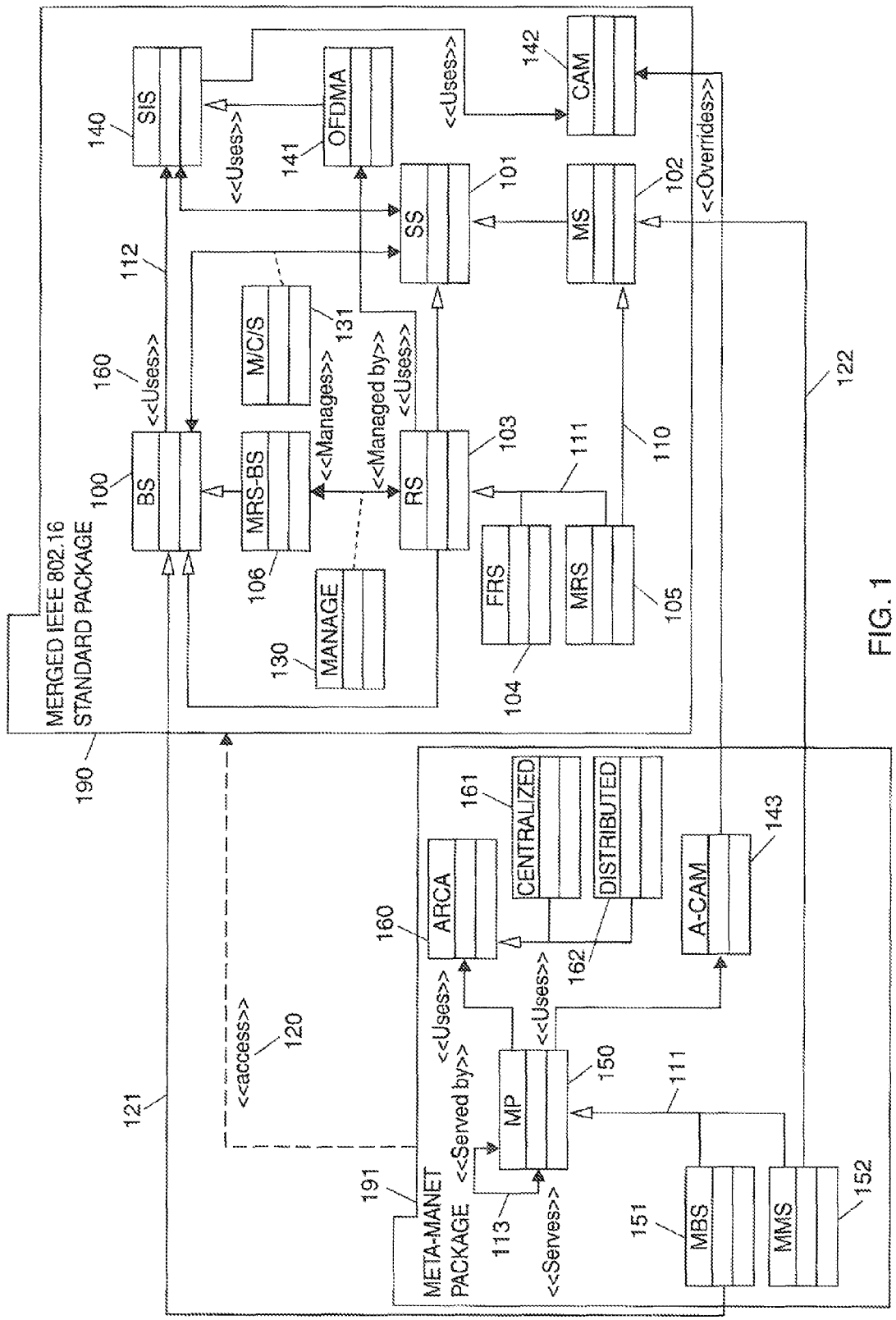
FIG. 1 is a UML structural diagram showing a number of nodes capable of operating in either of PMP or Mesh modes in a wireless communications network, according to the invention.

In the drawing, FIG. 1 uses known Unified Modeling Language (UML) notation to depict the logical relationship of functional components for certain nodes in a wireless communications network that are capable of operating in either a PMP or a mesh mode of operation, according to the invention. Classes 100, 101, 102, 103, 104, 105, and 106 at the right of FIG. 1, and classes 150, 151, and 152 at the left of the figure, represent the functions associated with the behavioral role that a corresponding node plays in the communications network. For example, a BS class, as at 100, represents the functions associated with a network node that exhibits the behavior of a Base Station. Classes 160, 161, 162, 143, 142, 141, and 140 in FIG. 1 represent other network protocol component functionality used by a node when assuming its role in the network.

FIG. 1 also illustrates different types of relationships between classes via arcs 110, 111, 112, 113, 120, 130, and 131 between the classes of nodes. For example, nodes connected by arc 110 having an open triangular arrowhead have a so-called "is a", or generalization/specialization, relationship that provides inheritance of properties. That is, node 105 at the tail end of arc 110 is a specialization of node 102 at the arrowhead end of the arc. In this example, node 105 inherits the properties of node 102, which in turn inherits the properties of node 101, and so forth. Therefore, in this case, node 105 is a specialization of both of the nodes 102 and 101.

Nodes connected by an arc with a closed arrowhead, such as arc 112, have an association relationship described by an adjacent label in angle brackets (<< . . . >>>), such as label 160. A more complex relationship is modeled by association classes such as classes 130 and 131. In class 130, the relationship of node 106 to node 103 is that the MRS-BS node 106 manages the RS node 103. The use of the association class 130 thus allows for greater control in modeling the complex relationship.

In UML, classes capture behaviors (via methods) and attributes. The network nodes modeled in FIG. 1 may have many behaviors and attributes not illustrated in the figure since they are not necessary for an understanding of the present invention. For a particular class, it is preferred to model complex attributes as separate classes with a relationship to the particular class. For example, classes 140 and 141 do not represent network nodes but, rather, represent two important attributes of network nodes. SIS class 140 represents a "signal in space" or radio frequency waveform used by a BS node. Class OFDMA 141 is a specific type of signal in space used by the RS network node class 103. This is important because it places constraints on the RS class as well as subclasses.

Figure 6:
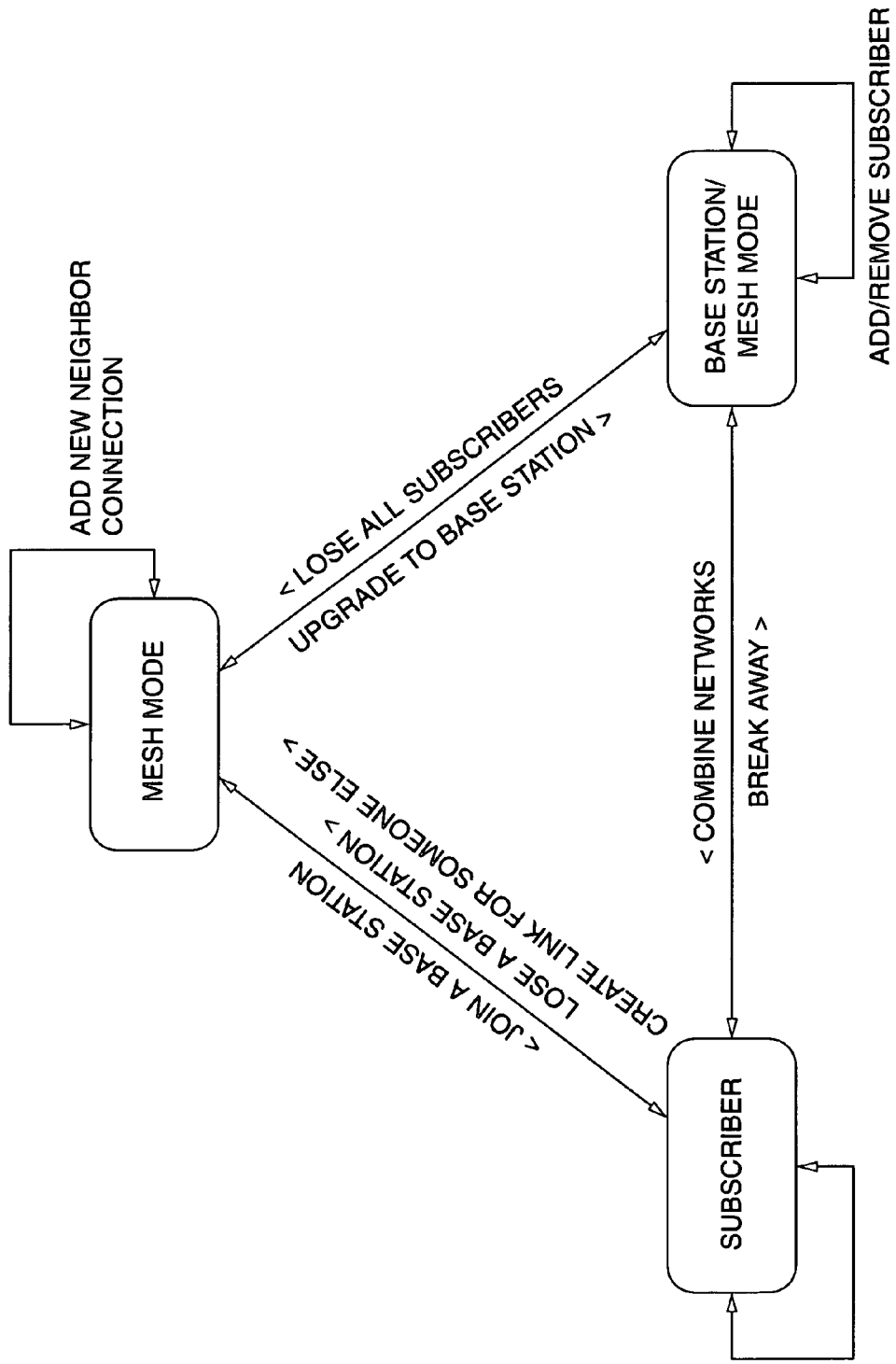
FIG. 6 is a UML structural diagram showing a relationship of the inventive process and system to a standards based PMP network.

UML allows groups of classes, and their associated namespaces, to be collected into corresponding packages 190 and 191 shown at the right and the left sides of FIG. 1. The relatively large package 190 at the right represents a namespace and a functionality defined by a collection of standards such as, e.g., IEEE 802.16. The package 191 represents a process and system according to the invention, and contains namespace and functionality not previously described. Package 191 has a relationship to package 190 represented by the labeled arc 120 which represents the fact that the package 191 "accesses" the functionality of the package 190. As part of that access, two classes contained in package 191 inherit a portion of their behavior from network node classes contained in package 190. This aspect is captured by the inheritance relationships designated by arcs 121 and 122. An expanded representation of the relationship of the two packages is shown in FIG. 6.

The following defines the roles of various nodes in one embodiment of a wireless communications network according to the invention:

A base station (BS) node, e.g., node 100 in FIG. 1, has the role of a central node in a PMP network. See FIG. 2. As described in, e.g., the IEEE 802.16d standard, a BS node is expected to remain stationary and typically operates from atop a tower or building. A BS node covers a fixed region of space and serves one or more subscriber nodes. BS nodes are generally connected via a separate RF channel or a wired connection to an external network 260 (FIG. 2) such as the Internet or a proprietary telecom provider network that links a multitude of BS nodes and, thus, enables communications among various subscriber nodes that may be connected to different BS nodes.

Subscriber nodes are either fixed subscriber stations (SS) such as node 101 in FIG. 1, or mobile subscriber stations (MS) such as node 102. The SS nodes are expected to be stationary, and each SS node must pass all of its communications through the BS node that serves it. The MS nodes are defined in §802.16e of the IEEE standard. and are expected to be mobile. They inherit the properties of a SS node, including the service relationship with the serving BS node. In the usual operating scenario, the §802.16e standard defines mechanisms whereby a MS node is "handed off" from one BS node to another BS node as the MS node moves out of the coverage area of the one BS node and into that of the other BS node.

Roles similar to those described in §802.16 of the IEEE standard may apply to any communications network operating in a PMP mode. An emerging standard, IEEE 802.16j, defines the role of a relay station (RS) such as node 103, which is a specialization of SS node 101 and is also a specialization of BS node 100. The §802.16j standard allows a RS node to serve an SS node by performing the functions of a BS node and relaying messages. The roles of the BS, the RS and the SS nodes are defined in the 802.16 standard and, as such, define certain protocols under which the invention described herein may operate. Reference herein to the IEEE 802.16 standard should not, however, be taken to preclude the present invention from application in other network environments such as, e.g., cellular networks (UMTS, Wideband CDMA, and the like).

Beyond the nodes defined in the existing standards, FIG. 1 also illustrates other nodes that may form a part of the present invention. First, a "mesh point" node (MP) 150 at the left in FIG. 1 is a node that operates as a node in a mesh network, communicating with a multiplicity of neighbors. An exemplary network topology appears in FIG. 3.

An MP node has two types of subclasses. One is the MBS (or mesh/base station) class 151 in FIG. 1, and the other is the MMS (or mesh/mobile subscriber) class 152. Note the structure of the "is a" relationship arc 111 indicates that a subclass may be either of type MBS 151 or MMS 152, but not both. The MBS class node 151 has an inheritance relationship 121 with the BS node 100 at the upper right in FIG. 1 and, therefore, is able to serve the role of a BS node and to have the same relationship to the hierarchy of subscriber nodes as that of a BS node. Since an MBS class node also inherits from an MP node, it contains the mesh functionality of the MP node as well.

The MMS class node 152 is a specialization of the MP node, and therefore inherits the mesh capabilities of the MP node. The MMS node 152 also has an inheritance relationship 122 with the MS node 102. Therefore, the MMS node 152 is also a specialization of the MS node 102 and it inherits the characteristics of the hierarchy of subscriber nodes.

Finally, the relationship 113 describes an association between MP nodes that are operating in various roles. The relationship is a reflexive association and connotes that an MP node that is behaving as an MMS node may be served by another MP node operating as a BS node. This hierarchy of inheritance allows for the changing operating roles, including the simultaneous operation of an MP node as both an MP node and a BS node. As mentioned, such role changing capability of certain nodes in the network is an important aspect of the present invention.

In addition to classes representing network nodes, package 191 in FIG. 1 contains a "A-CAM" class 143 (for adaptive-channel access method). The class 143 overrides the "CAM" (channel access method) class 142 in package 190 at the right of FIG. 1, which describes how the signal in space class 140 gains access to the channel. The A-CAM class 143 overrides the standard access behavior 142 by supporting an adaptive modification of channel access between contention-free and contention-based methods. Such adaptive behavior is not suggested by existing standards. According to the invention, as the dynamics of mobile operation act to change the topology and connectivity of nodes in the network, certain nodes change their behavior to operate as either PMP or mesh network nodes, or a combination of the two roles, and the nodes may change their channel access method as well in order to maintain communication across the network.

To support an adaptive role changing capability of the nodes, an adaptive role changing algorithm (ARCA) or process 160 is provided in package 191 at the left in FIG. 1. ARCA 160 represents a component of the functionality of MP class 150 that determines which role an MP node should assume at a given time in the network. Such a determination may possibly be made a priori and statically at the time of network deployment, so a centralized algorithm 161 may be used as a subclass of ARCA 160. It is also possible in certain scenarios to provide a single "command" node configured to maintain a global view of the network topology, and to determine what role each other node should assume at a particular instant. In general, however, an exchange of information needed to support a centralized approach under the dynamics of a large distributed MANET may require excessive overhead. For such scenarios, a subclass of distributed ARCA algorithms 162 may be implemented. Using a distributed ARCA, each node may then decide its role based only on local information concerning itself and its one-hop neighbors and, possibly, on information concerning its two-hop neighbors as well.

Figure 2:
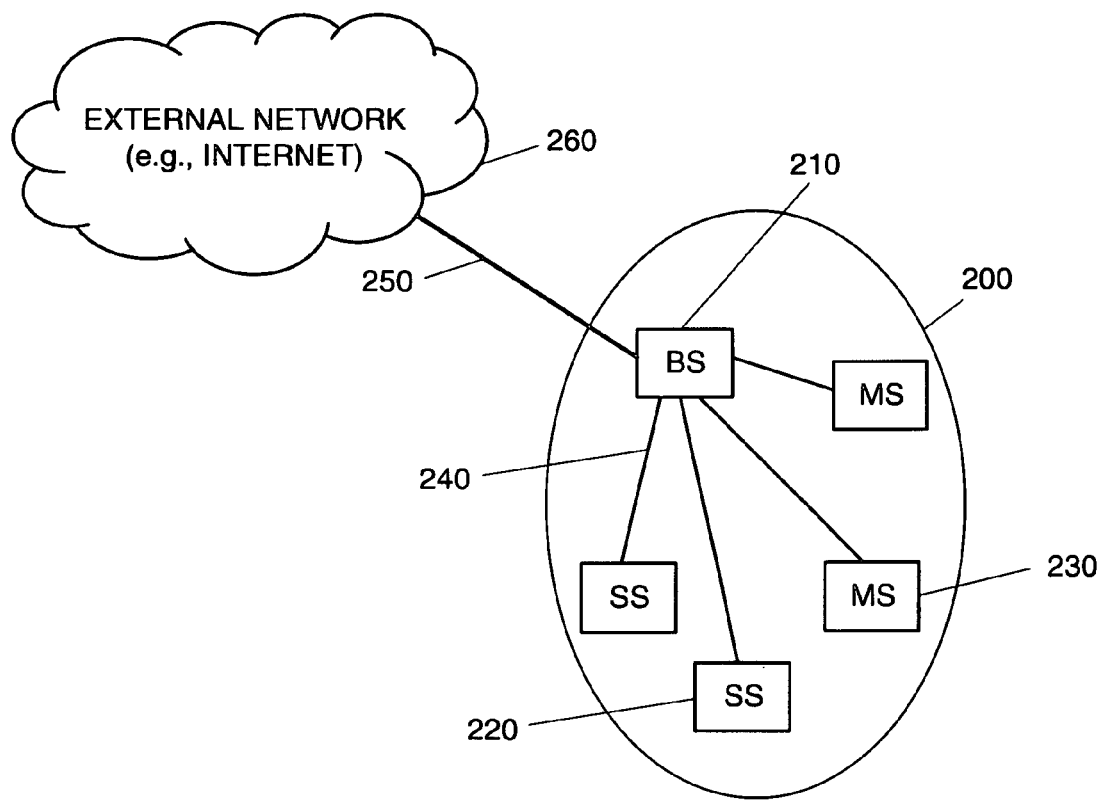
FIG. 2 is a schematic diagram illustrating a wireless communications network with a PMP topology.

FIG. 2 shows a topology of a wireless communications network implementing a point to multi-point (PMP) configuration. The network may practice one of several PMP protocol definitions, for example, IEEE §802.16-2004, IEEE §802.16e-2005, or related versions such as the known WiMAX or HIPERMAN protocols. The system may operate on many radio frequencies or channels. Instantaneous channel bandwidth may range from, e.g., roughly <1 MHz to 20 MHz, and bandwidths as high as 500 MHz may be feasible. The network may employ a wide variety of antennas such as, e.g., omni, fixed directional, sectored, beamforming, or adaptive. Multiple input multiple output (MIMO) technology may be applied, as well as multi-user detection (MUD). Known time division duplex (TDD) or frequency division duplex (FDD) techniques may also be incorporated, as well as a variety of different modulation and physical layer (PHY) types known to those skilled in the art. Well-known error correction coding (ECC) such as Viterbi, Reed Solomon, Turbo, and LDPC may be utilized possibly in combination with one another. Interleaving may be applied as well.

A PMP network differs from other wireless networks by the organization of nodes within the network. In FIG. 2, base station (BS) node 210 services a wireless coverage area 200 using RF transceivers and one or more antennas. A multiplicity of frequencies, PHYs, modulation methods, and symbol constellations may be used in a PMP network, as well as in other topologies described herein. A known media access control (MAC) protocol may be used to determine whether or not a given node within the wireless coverage area 200 should transmit or listen at a given instant of time.

Numerous fixed subscriber station nodes (SS) 220 may be located within the coverage area 200 along with a number of mobile subscriber station nodes (MS) 230. Subscriber stations needing services from the BS node 210 initially register and form links with the BS node. The BS node 210 determines and controls which stations receive and transmit during defined time slots by way of MAC messages. PMP links are represented by thin solid lines such as the link 240 in FIG. 2.

SS nodes 220 and MS nodes 230 may form links only with the BS node 210 and may not form links with one another even if they are within RF communications range. The BS node 210 forwards communications (packets or messages) that it receives among the subscriber station nodes 220, 230 as may be necessary within the coverage area 200, so that the nodes 220, 230 can communicate with each other. In addition, the BS node 210 normally provides connectivity with other networks via a connection 250 to an outside network 260, an example of which is the Internet. The connection 250 in FIG. 2 may be wireless or wired.

Figure 3:
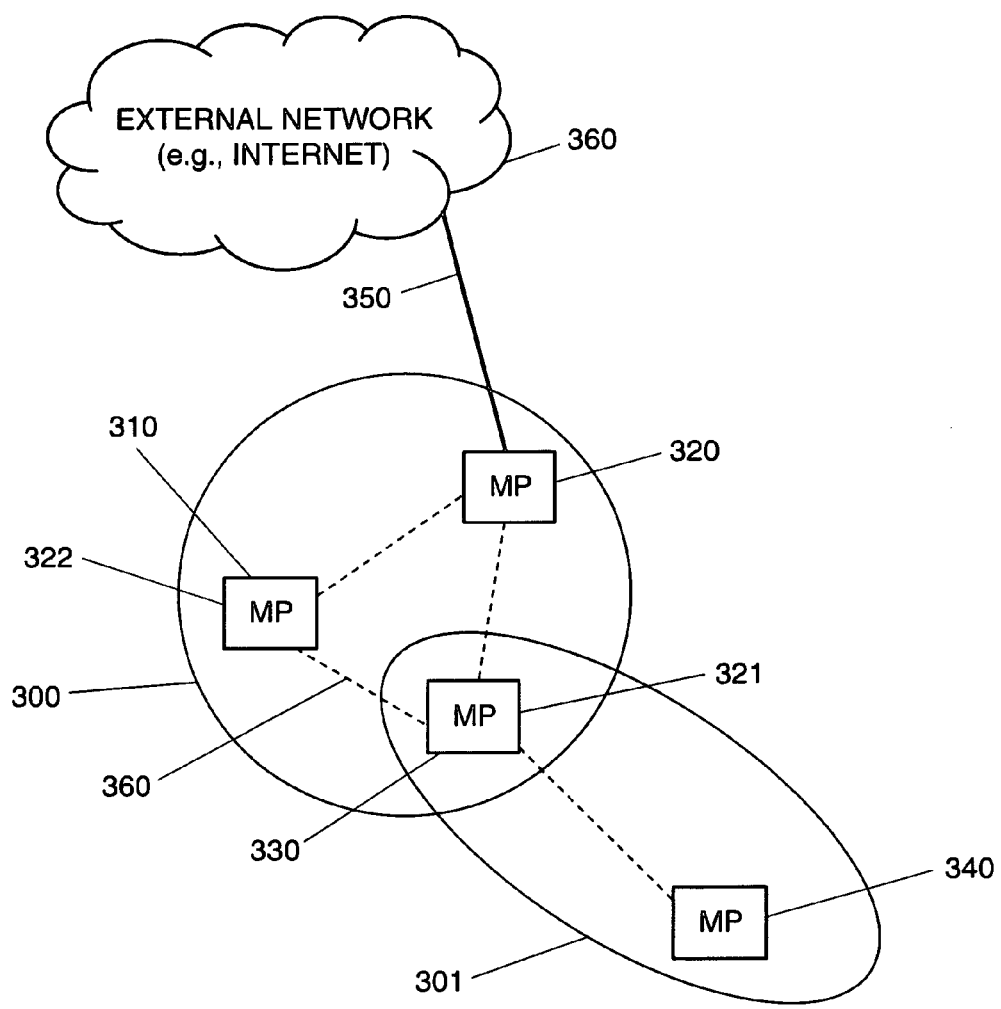
FIG. 3 is a schematic diagram illustrating a wireless communications network with a mesh topology.

FIG. 3 shows a topology of a wireless communications network implementing a mobile ad hoc network (MANET) or mesh network protocol. A MANET has a property that any of its nodes may be in motion while participating in the network. MANET networks are ad hoc in that it is not necessary to have assistance from a central authority (such as a BS node) to establish links between any two or more nodes in the network, nor do the links have to be preplanned. Any two nodes may establish a link independent of other communications entities. In addition, the nodes of a MANET may maintain multiple links at once.

The term "mesh network" may have various meanings. Typically, a mesh network is a special case of a MANET wherein at least some nodes are assumed to be static, and some amount of preplanning may be required. In addition, mesh nodes may require communications with a central authority to register with the mesh network. As used in the present disclosure, the terms MANET and mesh are used interchangeably, wherein either term is intended to imply the meaning of the more general MANET unless clearly stated otherwise.

The topology of FIG. 3 contains three MP nodes 320, 321, 322, which are within communications range of each other. In the drawing, links 360 formed using MANET or mesh protocols are indicated by dashed lines. The three MP nodes 320, 321 and 322 are fully connected in that each node can link with all other MP nodes within an area 300. Another wireless coverage area 301 contains MP nodes 321 and 340 which can also link with one another. MP node 340 cannot directly link with MP nodes 320 or 322, however. Thus, at the link level, the four MP nodes 320, 321, 322 and 340 are not fully connected.

But MP node 321 has an ability to forward traffic from MP node 340 to either one of MP nodes 320 or 322. In that way, MP node 340 can communicate with MP nodes that are not direct neighbors. Terms known to those skilled in the art include "one hop" and "two hop" neighbor nodes. That is, MP node 340 is a one hop neighbor to MP node 321 since only a single RF transmission is required to communicate a message between MP node 340 and MP node 321. MP node 340 is a two hop neighbor to MP node 320 in that a packet or message must undergo two RF transmissions in order to be communicated from MP node 340 to MP node 320 (via node 321).

In FIG. 3, MP node 320 is shown with a connection or link 350 to an external network 361. The connection 350 is typically a different RF communications channel, such as satellite communications, for nodes that are part of a MANET. Such a connection provides a path to information resources outside of the MANET network.

In accordance with one embodiment of the invention, a network of nodes at least some of which are MP nodes, is constructed and arranged to operate as a MANET capable of evolving between PMP and mesh operation. At any moment during network operation, one or more nodes may operate as both PMP and mesh modes so as to constitute a hybrid network. This concept is illustrated in FIG. 4 which shows one possible network topology 400 in which the network nodes are in a relatively static situation for which PMP operation is most favorable.

Figure 4:
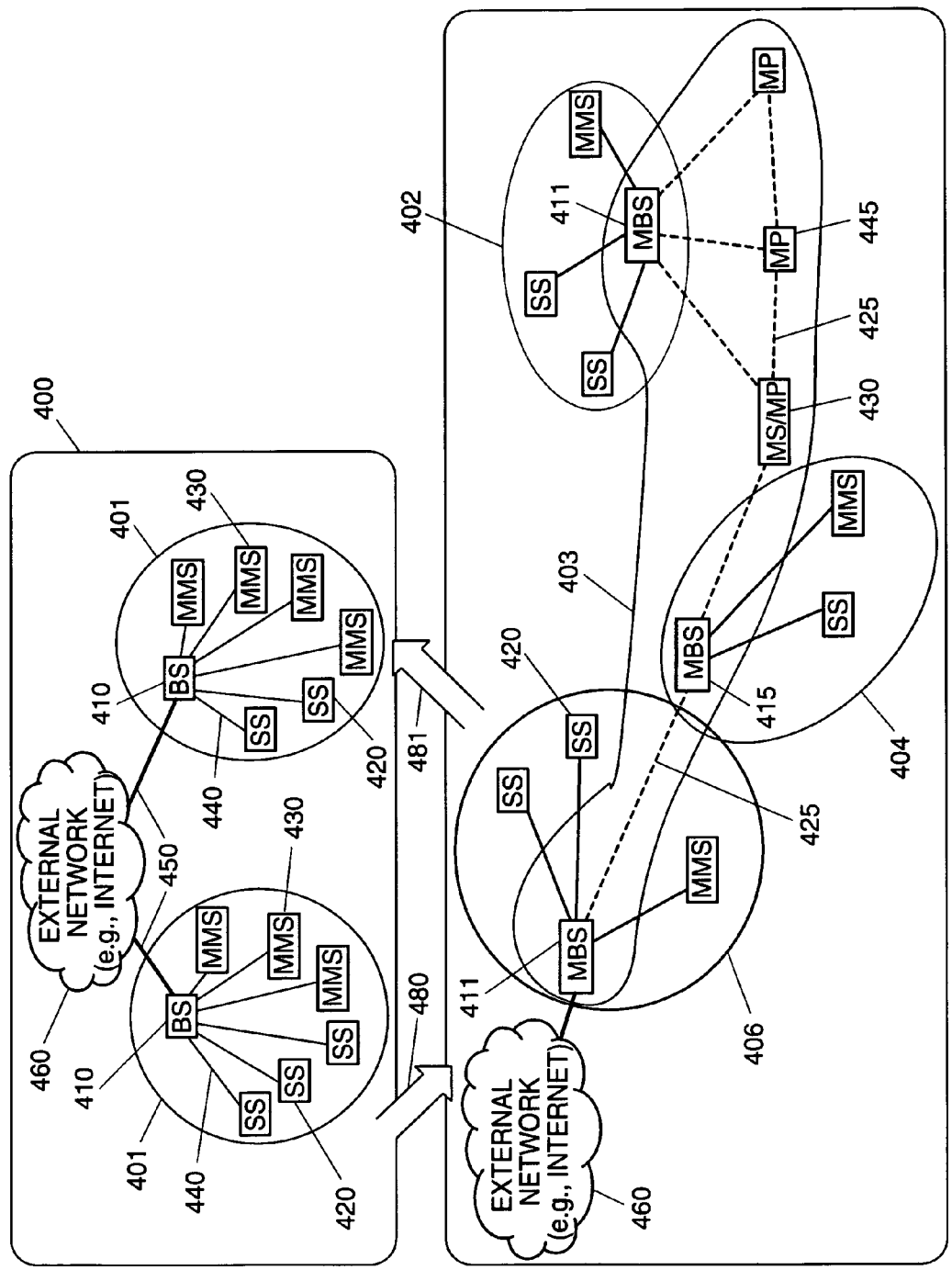
FIG. 4 is a block diagram illustrating a wireless communications network in which the roles of certain network nodes change adaptively between PMP and Mesh protocols, according to the invention.

In a military concept, the environment in FIG. 4 may correspond to the start of a mission at which time mobile nodes of each of two units are located at their corresponding bases, and are able to communicate under a PMP mode of operation via their BS nodes 410 which together serve all SS nodes 420 and all MP nodes 430 within corresponding coverage areas 401. The BS nodes 410 provide links 450 to external network resources 460 via a wireless satellite communications channel or other link. Arrow 480 connotes a movement of the nodes 420, 430 as the nodes embark on a mission, causing their topological relationship to one another to change. The environment surrounding the nodes, as well as their physical relationship to one another, will affect the quality of RF communications links and will likely impact the ability of the initially configured PMP networks to maintain communications among the nodes.

For example, at the bottom of FIG. 4, two SS nodes in area 404 have moved beyond an area of coverage 406 of their original BS node, and one of the nodes (415) has been promoted to assume a BS role so that it can take over providing base station service to other subscriber nodes inside the area 404. Specifically, node 415 has assumed the role of an MBS type of MP node, and this allows it to support a mesh communications infrastructure with other nodes acting as MP nodes. Also in FIG. 4, an initial BS node 410 in coverage area 401 has taken on an MBS role as node 411 and is able to serve SS nodes and MMS nodes inside the area 406, as well as communicate with other MP nodes 415, 430, 445 within a defined mesh coverage area 403. Some of the other MP nodes such as the node 411 may also be serving other subscriber nodes. Further, the node 411 may preserve a link to external networks and thus provide a gateway (via mesh links 425) allowing all of the network nodes to access the external information sources 460.

Arrow 481 indicates that when the mission is completed and the nodes return to a configuration for which PMP operation is more effective, the roles of the nodes change to reestablish the initial PMP network protocols. Although not shown in FIG. 4, the network may during operation at times evolve into a fully mesh mode. Full mesh operation may be possible if all nodes are capable of role changing, and have the resources to assume all of the adaptive roles. In FIG. 4, some nodes identified as SS nodes such as node 420, may not be capable of changing roles.

As the network topology evolves through mobile ad hoc network operations, each node that is capable of changing its role preferably should determine the particular role it will assume during a subsequent time interval using either the centralized or the distributed ARCA 161, 162 (FIG. 1). Role changing time intervals may be determined on a periodic basis. The intervals may occur regularly, or be event driven in which case they will occur irregularly. Event driven role changes, which are considered to be reactive, may be driven by changes in connectivity and by measurements of performance of an RF channel in use. Role changes at regular intervals may be considered proactive. Each approach has both beneficial and detrimental characteristics. According to the invention, either approach may be applied or the nodes programmed to change adaptively between the two methods.

For example, in a static ad hoc network without node mobility such as when vehicular nodes are parked, periodic reassessments of topology and roles may occur at relatively long intervals and be adequate to maintain connectivity while contributing little overhead traffic on the network. When the vehicle nodes move and the topology and RF environment changes rapidly, however, the reactive approach is better suited for maintaining connectivity at the cost of increased overhead traffic.

A wide range of ARCAs may be applied to optimize the adaptive behavior of the network and support user needs. For example, with a centralized ARCA, a specified node may maintain a view of the global topology and compute an appropriate role for each of the other nodes. The computed roles may then be disseminated over the network. This method is applicable, for example, in certain operational scenarios such as small, relatively static networks. The method may not scale well for very large, dynamic networks, however. An exemplary algorithm is illustrated in FIG. 5. The algorithm may be computed centrally by a single node that has knowledge of the topology of the entire network, and then optimizes the assignment of roles to create a minimum spanning tree.

The algorithm of FIG. 5 maintains two lists of nodes and reacts to a topology change event. Its first action is to de-assign the existing roles for all of the nodes in the Node_set, which is a list of all nodes in the network. It then sorts the nodes according to the number of unassigned neighbors, resulting in an ordering of the nodes from those with the most unassigned neighbors to those with the least. Next, the algorithm starts an inner loop in which the top node is removed from the list and set to be the Current_Node which is set to be a BS node. All one hop neighbor nodes of the Current_Node are set to be SS nodes. The Current_Node and all of its assigned one hop neighbors are then moved to a new list called the Assigned_set.

The Node_set is then resorted and the algorithm is applied to the remaining nodes until all nodes have been assigned. At this point the algorithm has organized the nodes into a disconnected set of PMP clusters. Each cluster has one BS node and a set of SS one hop neighbor nodes. The algorithm now creates a minimum spanning tree to link the BS nodes. It then walks that tree and promotes BS nodes to be MBS nodes, and SS nodes to be MP nodes in order to create a mesh linking the PMP clusters as shown in the lower half of FIG. 4. When the algorithm completes, the role of every node is determined and the roles may be disseminated to the corresponding nodes.

The algorithm can also be implemented by a distributed method according to the invention, in which each node participates in the decision making. An exemplary algorithm is illustrated in FIGS. 7a and 7b. In a realization of the distributed ARCA 162 in FIG. 1, the functional class contains attributes responsible for maintaining information about current and historical network topology, as well as methods or other classes that implement topology management behavior. One component of the class is the implementation of topology awareness and processing of that information. This component accepts discovery messages from other nodes in the network, processes the information contained within the messages, and generates data for the Current Topology Knowledge data structure referenced in the algorithm of FIGS. 7a and 7b. As described previously, this may occur based on external events (e.g., the receipt of a new discovery message) or periodically based on a timer, or a combination of both. Every cycle checks for a change in the topology according to data contained in the Historical Topology Knowledge referenced in the algorithm of FIGS. 7a and 7b.

Another component of the distributed ARCA 162 is a Discovery Listener 701. This component transmits a discovery message periodically by broadcasting on a common discovery channel and also listens for incoming discovery messages from other nodes. The discovery message preferably contains, at a minimum:

1. A globally unique identifier;
2. A unique cluster identifier;
3. Information about recent changes in role;
4. Number of connected neighbors according to the last heard topology information;
5. The number of neighbors according to last heard topology information;
6. Current role of the Node; and
7. Status of the Node (e.g., ISOLATED).

Another component of the distributed ARCA 162 called the ARCA_Topology_Manager 702 is responsible for evaluating the current topology knowledge, and for determining and effecting any necessary role change. For the distributed ARCA_Topology_Manager, a state transition diagram appears as in FIG. 6, and example pseudo-code for the algorithm is detailed in FIG. 7a. When the ARCA_Topology_Manager function determines a need for a role change, it can effect that change by invoking another component called the ARCA_Change_Manager 703 in FIG. 7b.

Figure 8:
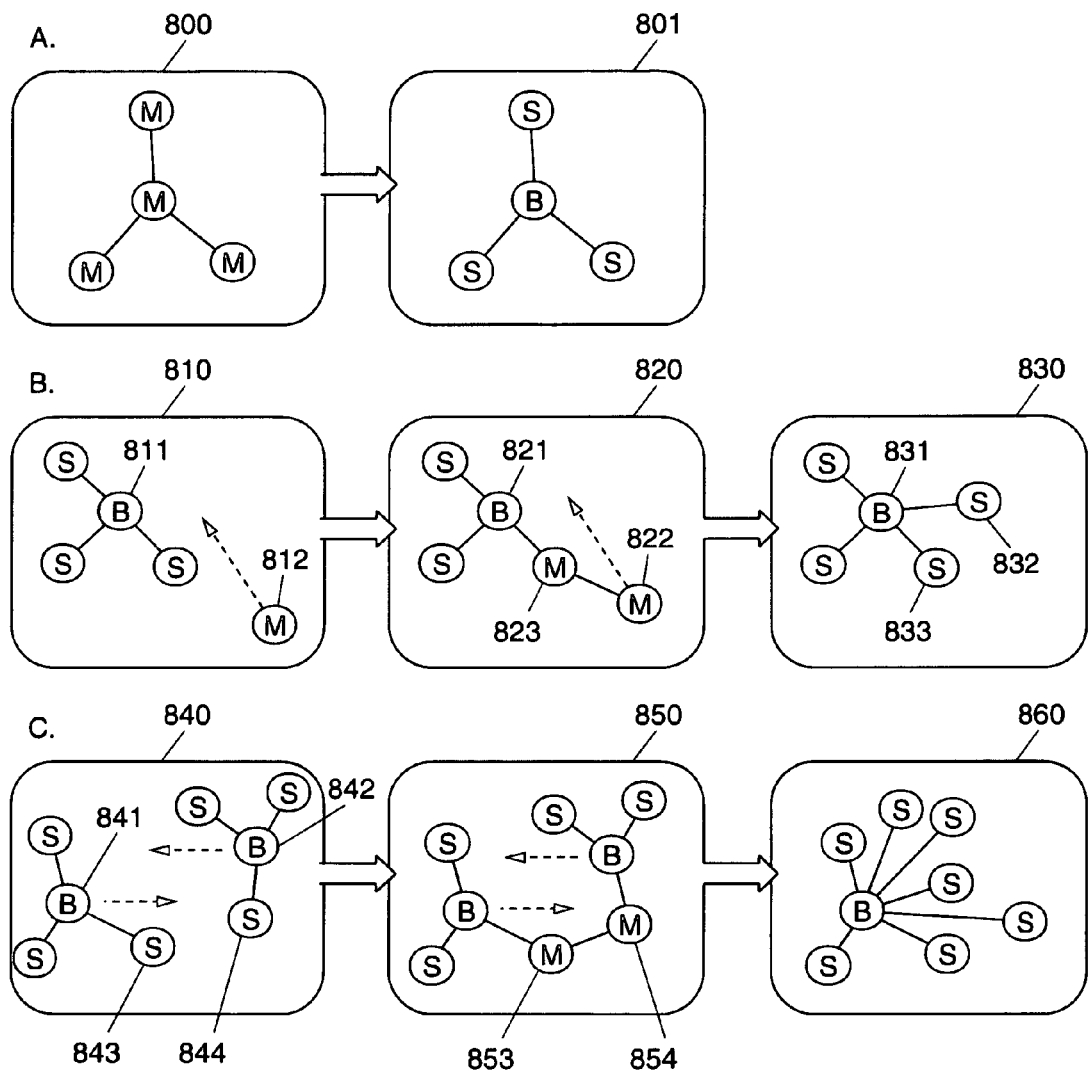
FIGS. 8A to 8C show a sequence of examples of the distributed algorithm in FIG. 7.

A sequence of examples of the distributed algorithm are shown in FIGS. 8A, 8B and 8C. In FIG. 8A, a mesh network 800 changes into a PMP network 801 as a result of a highly connected central node making a decision to upgrade itself to a base station B. Upon upgrade, the other mesh nodes surrounding it will sense the new base station B and change into subscriber nodes S.

In FIG. 8B, network 810 is in a state in which a PMP network 811 is approached by an isolated node 812 in a mesh state (M). The mesh node 812 is sending a discovery message with a flag set for the need for a connection. The subscriber node closest to the mesh node 812 overhears the message and changes its itself into a mesh mode note 823 to accommodate the joining mesh node (now 822). When the mesh node 822 moves within range (as in topology 830) of the base station node (now 831), the joining node senses the availability of the base station node 831 and changes its mode to that of a subscriber node 832. The mesh node 823 senses a loss of connection with the mesh node 822, concludes there is no longer a need to act as a relay station, and changes its role back to that of a subscriber station node 833.

FIG. 8C illustrates two PMP networks within an area 840 moving toward one another and combining to form a single PMP network within area 860. A link is initially triggered in a mesh mode wherein individual subscriber nodes 843 and 844 of the two PMP networks come within range and change their roles to mesh (M) to form a link 853 <- - -> 854. As the two networks converge, a base station node (B) 842 of one of the networks changes its role to that of a subscriber station node (S) in the merged PMP network 860.

While the disclosed method and system may refer to existing standards such as, e.g., IEEE 802.16, other existing or as yet undefined standards that relate to PMP networks may be incorporated as well. A relationship between the disclosed method and system and a set of IEEE 802.16 standards is illustrated in the UML diagram of FIG. 9, wherein the specifications of the IEEE standards are represented as UML Packages 901, 902 and 903 which contain the namespace and functionality of the standard.

Figure 9:
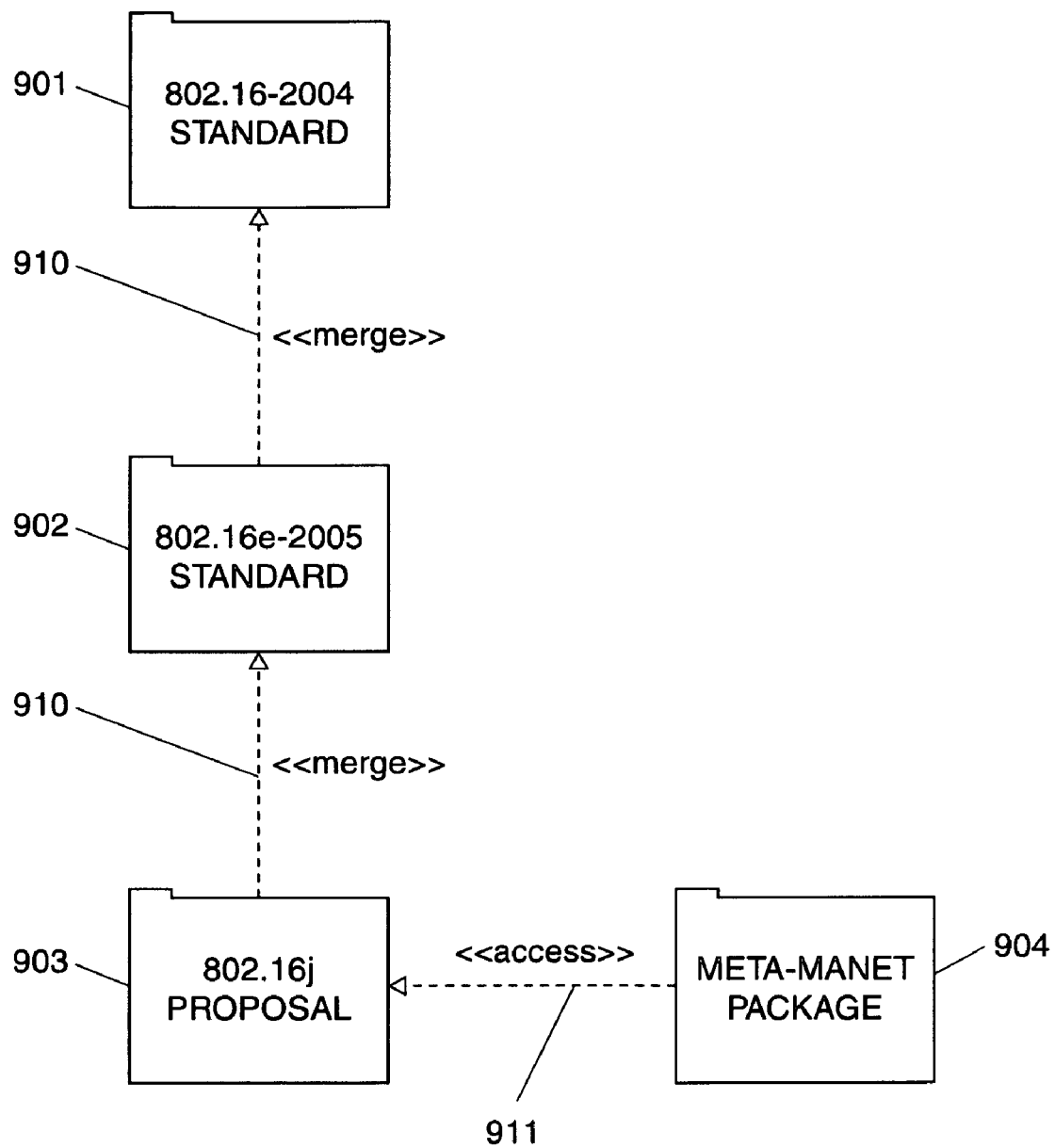
FIG. 9 shows packages representing amendments to an existing PMP protocol standard that modify or add functionality according to the invention.

The vertically arranged sequence of packages in FIG. 9 represents subsequent amendments to the standard that modify or add functionality. The relationship of these packages is <<merge>> 910, which indicates that together they form a new target of namespace and functionality. The inventive method and system is represented by a package 904 labeled META (for Mesh Enabled Tactical Adaptive)—MANET. This package has a relationship of <<access>> 911 to the standards, indicating that while the namespace and functionality of META-MANET accesses the functions of the standard, it need not be merged into the standard.

While the foregoing represents preferred embodiments of the invention, it will be understood by those skilled in the art that various modifications and changes may be made without departing from the spirit and scope of the invention, and that the invention includes all such modifications and changes as come within the scope of the following claims.

We claim:

1. A method of enhancing or maintaining connectivity among nodes of a wireless communications network by adapting to changes in topology of the network, comprising:
configuring a given node of a first set of one or more nodes of the network to operate according to a selected one or both of:
(i) an ad hoc protocol wherein the node assumes a role of a mesh point node capable of connecting with other mesh point nodes of the network in communications range of the node, and
(ii) a point-to-multipoint protocol wherein the node assumes a role different from that of a mesh point node and selected from among:
(a) a base station node wherein the node operates as a central node that covers a certain region of space for serving one or more subscriber station nodes and for passing all communications of the subscriber station nodes through the node, and
(b) a subscriber station node wherein the node is served by another node of the network in communications range and which other node is operating as a base station node, and wherein the node is operative to link only with the other node; and
dynamically changing the role or roles assumed by the node among the ad hoc protocol, the point-to-multipoint protocol, and both of said protocols simultaneously, for adapting to a changing network topology and for maintaining an optimum state of connectivity among the nodes of the network.

2. The method of claim 1, including performing the dynamically changing step at certain time intervals.

3. The method of claim 2, including performing the dynamically changing step at regular intervals for proactively maintaining an optimum state of connectivity among the nodes of the network.

4. The method of claim 2, including performing the dynamically changing step in response to a detected change in the state of connectivity among the nodes of the network.

5. The method of claim 1, wherein the first set of nodes are configured to carry out the dynamically changing step according to measures of network performance that are distributed through the network.

6. The method of claim 1, wherein a specific node of the network carries out the dynamically changing step according to a view of the global topology of the network maintained by the specific node.

7. The method of claim 1, including associating a dynamic change in the role of a node of the first set of nodes with an adaptive change in a channel access method used by the node in order to maintain connectivity with disadvantaged nodes of the network.

8. The method of claim 1, including defining a mesh/base station (MBS) class node as a subclass of a class of mesh point (MP) nodes, by operating the node under both of the ad hoc and the point-to-multipoint protocols simultaneously, and as the base station node under the point-to-multipoint protocol.

9. The method of claim 1, including defining a mesh/mobile subscriber (MMS) class node as a subclass of a class of mesh point (MP) nodes, by operating the node under both of the ad hoc and the point-to-multipoint protocols simultaneously, and as the subscriber station node under the point-to-multipoint protocol.

10. The method of claim 1, wherein the dynamically changing step includes changing a channel access method used by the given node.

11. A wireless communications network, comprising:
a first set of one or more nodes, wherein a given node of the set is constructed and arranged to operate according to a selected one or both of:
(i) an ad hoc protocol wherein the given node assumes a role of a mesh point node capable of connecting with other mesh point nodes of the network in communications range of the node, and
(ii) a point-to-multipoint protocol wherein the node assumes a role different from that of a mesh point node and selected from among:
(a) a base station node wherein the given node operates as a central node that covers a certain region of space for serving one or more subscriber station nodes and for passing all communications of the subscriber station nodes through the node, and
(b) a subscriber station node wherein the given node is served by another node of the network in communications range and which other node is operating as a base station node, and wherein the given node is operative to link only with the other node; and one or more nodes configured to determine, for the given node, which role or roles the given node should assume among the ad hoc protocol, the point-to-multipoint protocol, and both of said protocols simultaneously, in order to adapt to changes in network topology and to maintain an optimum state of connectivity among the nodes of the network;

and wherein the given node is configured to assume the determined role or roles.

12. The network of claim 11, wherein said one or more nodes of the network are configured to be responsive to measures of network performance distributed through the network when determining the role or roles to be assumed by the given node.

13. The network of claim 12, wherein only a central node of the network is operative to determine the role or roles to be assumed by the given node.

14. The network of claim 11, wherein the given node is defined as a mesh/base station (MBS) node including properties of a mesh point (MP) node when both of the ad hoc and the point-to-multipoint protocols are chosen simultaneously for the node and the node operates as the base station under the point-to-multipoint protocol.

15. The network of claim 11, wherein the given node is defined as a mesh/mobile subscriber (MMS) node including properties of a mesh point (MP) node when both of the ad hoc and the point-to-multipoint protocols are chosen simultaneously for the node and the node operates as the subscriber station under the point-to-multipoint protocol.

16. A method of enabling first nodes of a first network having a node operating as a first base station node under a point-to-multipoint protocol, and second nodes of a second network having a node operating as a second base station node under the point-to-multipoint protocol, to combine to form a third network having a common base station node operating under the point-to-multipoint protocol, comprising:

configuring each of one or more first nodes of the first network and each of one or more second nodes of the second network to operate according to a selected one or both of:

(i) an ad hoc protocol wherein each node assumes a role of a mesh point node capable of connecting with other mesh point nodes of the first and the second networks in communications range of the node, and (ii) the point-to-multipoint protocol wherein each node assumes a role different from that of a mesh point node and selected from among:

(a) a base station node wherein the node operates as a central node that covers a certain region of space for serving one or more subscriber station nodes and for passing all communications of the subscriber station nodes through the node, and (b) a subscriber station node wherein the node is served by another node of the first or the second network in communications range and which other node is operating as a base station node, and the node is operative to link only with the other node;

establishing a link between a given first node of the first network and a given second node of the second network when the two given nodes come within range of one another, by operating each of the two given nodes in the role of a mesh point node under the ad hoc protocol; and forming the combined third network by changing the role of one of the first base station node of the first network and the second base station node of the second network to the role of a subscriber station node under the point-to-multipoint protocol, and operating the other one of the first and the second base station nodes as the common base station node of the third network under the point-to-multipoint protocol.

* * * * *